Figure 1:
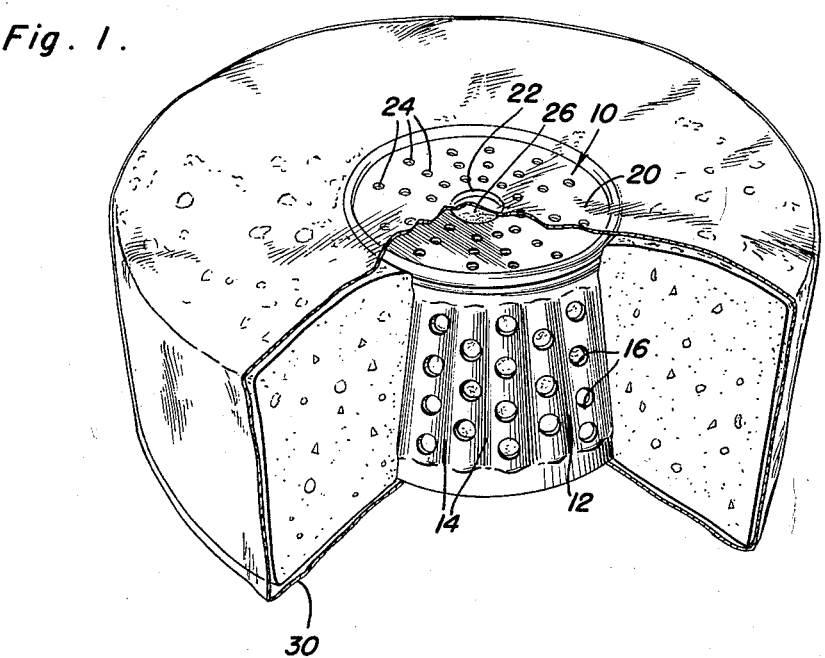

Oct. 31, 1950     J. N. KUBRICHT     2,528,233

APPARATUS FOR FLAVORING BAKERY PRODUCTS

Filed Sept. 27, 1948

Inventor

John N. Kubricht

By Clarence A. O'Brien
and Harvey B. Jacobson
Attorneys

Patented Oct. 31, 1950

2,528,233

UNITED STATES PATENT OFFICE 2,528,233

APPARATUS FOR FLAVORING BAKERY PRODUCTS

John N. Kubricht, Cherokee, Okla.

Application September 27, 1948, Serial No. 51,453

2 Claims. (Cl. 99—234)

This invention relates to a method and apparatus for flavoring bakery products, and more particularly for flavoring cakes, such as fruit cakes of the type having an axial opening extending therethrough.

A primary object of the invention is to hold a supply of flavoring liquid, particularly of the volatile type within a cake of the type above referred to so that the fumes from the flavoring liquid will penetrate the cake.

Another object is to facilitate the addition of flavoring liquid, and to retain it in close proximity to the cake for long periods of time.

A still further object is gradually to feed into the cake limited amounts of the flavoring liquid and cause it to permeate the cake.

The above and other objects may be attained by employing this invention which includes introducing into the opening which extends through a cake, such as a fruit cake, a liquid absorbent and saturating the absorbent with a volatile flavoring liquid.

Other features include periodically adding the volatile flavoring liquid to the absorbent and enclosing the cake and absorbent in a wrapper to retain the volatile product within the cake.

Still other features include a tubular body having an external contour conforming substantially to the size and shape of the opening in a cake of the type having an axial opening extending therethrough, said body having a plurality of perforations therein, a bottom closing one end of the tubular body, a perforated top closing the upper end of the body and a liquid absorbent in said body.

Figure 2:
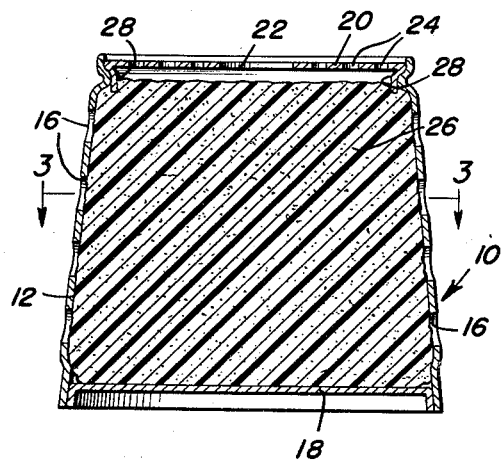
Figure 3:
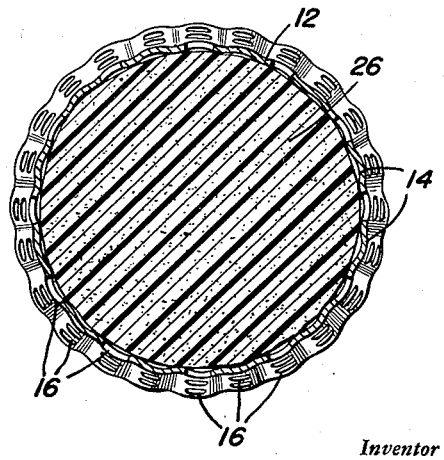

In the drawings:

Figure 1 is a fragmentary perspective view of a cake showing this improved flavor cup in place therein, Figure 2 is an enlarged vertical sectional view through the flavor cup, and Figure 3 is a transverse sectional view taken substantially along the line 3—3 of Figure 2.

Referring to the drawings in detail this improved flavor cup designated generally 10 comprises a tubular body 11, which is preferably formed with longitudinally extending flutes 14, and is of an external contour conforming substantially to the sides and shape of the axial opening of a cake of the type which is conventionally baked in a pan having a central frusto-conical tube. The body 12 is perforated with spaced perforations 16, and closing the larger end of the body is a bottom 18 which is preferably permanently secured in place within the body. The end of the body remote from the bottom 18 is closed by a removable cover 20 which is preferably provided with a relatively large central opening 22 surrounded by a group of smaller openings 24, and contained within the body is a liquid absorbent 26, such as a conventional sponge. In the preferred form of the invention the top 20 is provided with an annular depending flange 28 which holds the top in proper position on the body by fitting into the reduced end thereof as will be readily understood upon reference to Figure 2.

In use the cup 10 with the absorbent 26 contained therein, and the top 20 in place thereon is introduced to the axial opening of a cake as suggested in Figure 1, so that the flutes 14 engage the walls of the central opening in the cake, slightly to space the main body of the cup 10 from the cake. Having placed the cup in the cake, the flavoring liquid is poured into the cup onto the absorbent 26 through the central opening 22 in the top 20 so as to saturate the absorbent. The cake with the cup is then preferably enclosed in a suitable wrapper 30, preferably of the type of a cellulose film such as that commonly known as "Cellophane" which will serve to confine the volatilized products and cause them to permeate the cake. At the same time a small amount of liquid will be fed through the perforations 16 into the cake so as to keep it moist, and from time to time additional flavoring liquid is applied to the absorbent 26 through the opening 22 in order to keep the absorbent thoroughly saturated with the flavoring liquid.

In this way a cake, such as a fruit cake may be preserved in a moist condition for an indefinite period of time and may be flavored to suit the taste of the consumer, particularly when the flavoring employed is of the alcoholic type which will readily volatilize and permeate the cake.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In combination with a cake having an opening extending therethrough, a flavor cup comprising a tubular body having a fluted, perforated side wall conforming substantially to the size and shape of the opening, an annular groove adjacent the upper end of said side wall, an imperforate bottom closing the lower end of said tubular body, a perforated top closing the upper end of said body and including an annular depending flange engaging the inner surface of said side wall at said annular groove, and an absorbent in said body adapted to retain a volatile flavoring liquid.

2. The combination of claim 1 wherein said tubular body, bottom and top are formed of heavy waxed paper.

JOHN N. KUBRICHT.

REFERENCES CITED

The following references are of record in the file of this patent:

UNITED STATES PATENTS

| Number | Name | Date |
| --- | --- | --- |
| Re. 15,588 | Bishop et al. | May 1, 1923 |
| 965,381 | Falk | July 26, 1910 |
| 1,998,683 | Montgomery | Apr. 23, 1935 |
| 2,202,796 | Herman | July 30, 1938 |
| 2,271,921 | Luker | Feb. 3, 1942 |
| 2,357,258 | Harris | Aug. 29, 1944 |